US012682468B2

(12) United States Patent
Yin

(10) Patent No.: US 12,682,468 B2
(45) Date of Patent: Jul. 14, 2026

(54) TARGET PEDESTRIAN TRACKING METHOD AND APPARATUS

(71) Applicant: BOE TECHNOLOGY GROUP CO., LTD., Beijing (CN)

(72) Inventor: Xiaoyu Yin, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 301 days.

(21) Appl. No.: 18/576,953

(22) PCT Filed: Nov. 25, 2022

(86) PCT No.: PCT/CN2022/134309
§ 371 (c)(1),
(2) Date: Jan. 5, 2024

(87) PCT Pub. No.: WO2024/108539
PCT Pub. Date: May 30, 2024

(65) Prior Publication Data
US 2025/0005767 A1 Jan. 2, 2025

(51) Int. Cl.
*G06V 20/54* (2022.01)
*G06T 7/246* (2017.01)

(52) U.S. Cl.
CPC .............. *G06T 7/246* (2017.01); *G06V 20/54* (2022.01); *G06T 2207/30204* (2013.01); *G06T 2207/30241* (2013.01); *G06V 2201/07* (2022.01)

(58) Field of Classification Search
CPC ........... G06T 7/246; G06T 2207/30204; G06T 2207/30241; G06T 2207/30196; G06V 20/54; G06V 2201/07; G06V 40/103; G06V 20/40
See application file for complete search history.

(56) References Cited

U.S. PATENT DOCUMENTS

2022/0180534 A1 6/2022 Sun et al.
2023/0094532 A1* 3/2023 Nakatsugawa ........ G16H 10/60 340/517

FOREIGN PATENT DOCUMENTS

| | | | | |
|---|---|---|---|---|
| CN | 106651916 A | | 5/2017 | |
| CN | 110532923 A | | 12/2019 | |
| CN | 111832400 A | | 10/2020 | |
| CN | 112528812 A | | 3/2021 | |
| CN | 113658192 A | | 11/2021 | |
| CN | 113761964 A | | 12/2021 | |
| CN | 114203310 A | | 3/2022 | |
| CN | 115187916 A | * | 10/2022 | ........... G06V 10/761 |

(Continued)

*Primary Examiner* — Huo Long Chen
(74) *Attorney, Agent, or Firm* — WHDA, LLP

(57) ABSTRACT

A target pedestrian tracking method includes: obtaining a plurality of frames of image information; identifying pedestrians and enclosed geographic markers in the image information; assigning a corresponding tracking identifier to each pedestrian; and for a target tracking identifier, obtaining trajectory points of a target pedestrian corresponding to the target tracking identifier in the plurality of frames of image information, and determining a trajectory of the target pedestrian according to the trajectory points of the target pedestrian in the plurality of frames of image information, where the trajectory of the target pedestrian includes a geographic marker and a specific location that the target pedestrian has been to.

13 Claims, 2 Drawing Sheets

(56) References Cited

FOREIGN PATENT DOCUMENTS

| | | | |
|---|---|---|---|
| CN | 115272949 | A | 11/2022 |
| WO | 2021/114702 | A1 | 6/2021 |

* cited by examiner obtaining video information, and parsing the video information to obtain a plurality of frames of image information ⟶ 101 identifying pedestrians and enclosed geographic markers in the image information ⟶ 102 assigning a corresponding tracking identifier to each pedestrian ⟶ 103 for a target tracking identifier, obtaining trajectory points of a target pedestrian corresponding to the target tracking identifier in the plurality of frames of image information, and determining a trajectory of the target pedestrian according to the trajectory points of the target pedestrian in the plurality of frames of image information, where the trajectory of the target pedestrian includes a geographic marker and a specific location that the target pedestrian has been to ⟶ 104

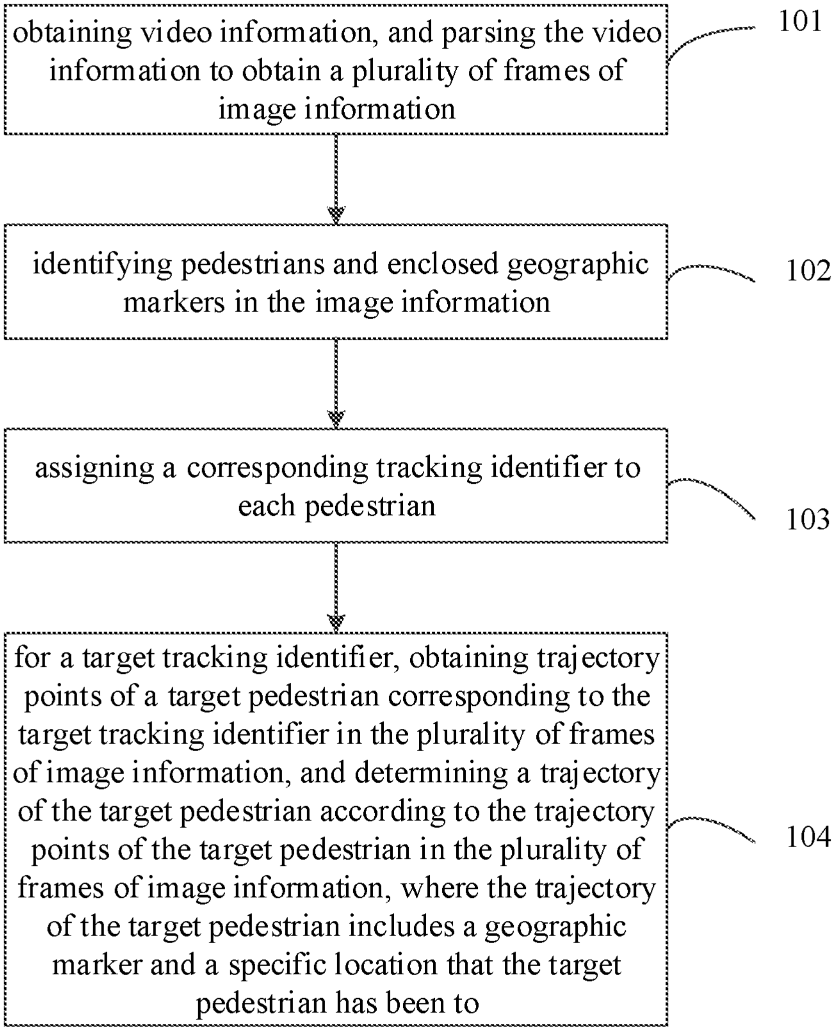

Fig. 1

A shops at store 1

Pedestrian A enters shopping mall store 1

A shops at store 2 garage

Pedestrian B enters garage store 2 pedestrian entrance

B shops at store 2

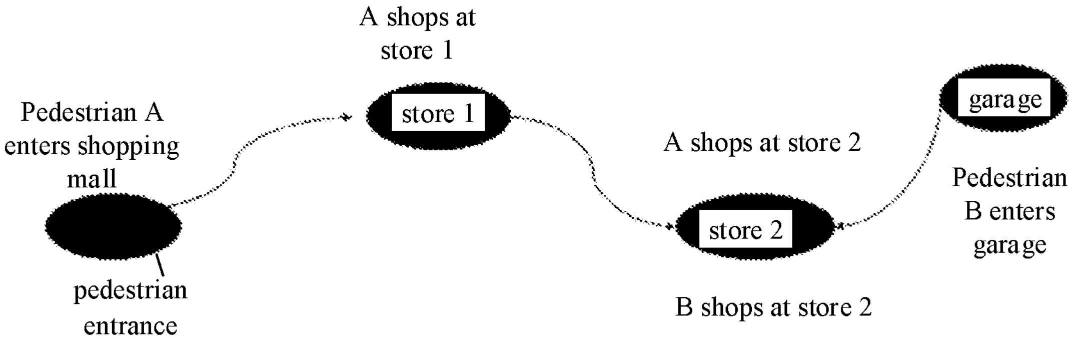

Fig. 2

TARGET PEDESTRIAN TRACKING METHOD AND APPARATUS

CROSS-REFERENCE TO RELATED APPLICATION

The present application is the U.S. national phase of PCT Application No. PCT/CN2022/134309 filed on Nov. 25, 2022, which is incorporated by reference herein in its entirety.

TECHNICAL FIELD

The present disclosure relates to the field of image processing technology, in particular to a target pedestrian tracking method and apparatus.

BACKGROUND

In the prior art, tracking and locating target pedestrians is realized by manually viewing a video, which takes a lot of manpower, material resources and time.

SUMMARY

The technical problem to be solved by the present disclosure is to provide a target pedestrian tracking method and apparatus, so as to improve the tracking efficiency of the target pedestrian.

In order to solve the above technical problem, the embodiments of the present disclosure provide the following technical solutions.

In an aspect, a target pedestrian tracking method is provided, including:

obtaining video information, and parsing the video information to obtain a plurality of frames of image information;

identifying pedestrians and enclosed geographic markers in the image information;

assigning a corresponding tracking identifier to each pedestrian; and for a target tracking identifier, obtaining trajectory points of a target pedestrian corresponding to the target tracking identifier in the plurality of frames of image information, and determining a trajectory of the target pedestrian according to the trajectory points of the target pedestrian in the plurality of frames of image information, wherein the trajectory of the target pedestrian includes a geographic marker and a specific location that the target pedestrian has been to.

In some embodiments, after the trajectory of the target pedestrian is obtained, the method further includes determining an associated pedestrian associated with the target pedestrian, including at least one of:

determining, according to the trajectory of the target pedestrian, a first target geographic marker that the target pedestrian has been to and a first time period during which the target pedestrian has stayed at the first target geographic marker, and determining, according to image information corresponding to the first target geographic marker, another pedestrian that has stayed at the first target geographic marker in the first time period as a first associated pedestrian, and a degree of association between the first associated pedestrian and the target pedestrian as a first degree of association;

determining, according to image information corresponding to the target pedestrian, another pedestrian having a distance less than a preset distance from the target pedestrian as a first associated pedestrian;

determining, according to image information corresponding to the target pedestrian, another pedestrian that has touched a same article as the target pedestrian as a first associated pedestrian; or determining, according to image information corresponding to a first target geographic marker, another pedestrian that has stayed at the first target geographic marker in a second time period as a second associated pedestrian, and a degree of association between the second associated pedestrian and the target pedestrian as a second degree of association, the second time period being a time period after the first time period.

In some embodiments, after determining, according to the trajectory of the target pedestrian, the first target geographic marker that the target pedestrian has been to, the method further includes:

determining whether the target pedestrian wears a mask in the first target geographic marker according to the image information corresponding to the first target geographic marker; and in response to that the target pedestrian does not wear a mask, obtaining map data, and marking the first target geographic marker as a geographic marker of a first risk level on a map corresponding to the map data; and in response to that the target pedestrian wears a mask, marking the first target geographic marker as a geographic marker of a second risk level on the map corresponding to the map data.

In some embodiments, after marking the first target geographic marker as a geographic marker of a first risk level or a second risk level on the map, the method further includes: upon receiving a click instruction for the first target geographic marker on the map, displaying on the map a trajectory of the target pedestrian within the first target geographic marker and the first time period.

In some embodiments, determining an associated pedestrian associated with the target pedestrian, further includes at least one of:

determining, according to a trajectory of the first associated pedestrian, a second target geographic marker that the first associated pedestrian has been to and a third time period during which the first associated pedestrian has stayed at the second target geographic marker; and determining, according to image information corresponding to the second target geographic marker, another pedestrian that has stayed at the second target geographic marker in the third time period as a third associated pedestrian, and a degree of association between the third associated pedestrian and the target pedestrian as a third degree of association;

determining, according to image information corresponding to the first associated pedestrian, another pedestrian having a distance less than a preset distance from the first associated pedestrian as a third associated pedestrian; or determining, according to image information corresponding to the first associated pedestrian, another pedestrian that has touched a same article as the first associated pedestrian as a third associated pedestrian.

In some embodiments, after determining the associated pedestrian associated with the target pedestrian, the method further including:

determining a first tracking identifier corresponding to the associated pedestrian, obtaining trajectory points of the associated pedestrian corresponding to the first tracking identifier in the plurality of frames of image information, and determining a trajectory of the associated pedestrian according to the trajectory points of the associated pedestrian in the plurality of frames of image information; and determine identity information of the associated pedestrian according to the trajectory of the associated pedestrian, and sending target information to a mobile device of the associated pedestrian corresponding to the identity information, the target information including at least one of: that the associated pedestrian is associated with the target pedestrian, a degree of association between the associated pedestrian and the target pedestrian, the first target geographic marker, and a closest distance from the associated pedestrian to the target pedestrian.

In some embodiments, determining identity information of the associated pedestrian according to the trajectory of the associated pedestrian, includes: determining, according to the trajectory of the associated pedestrian, a first geographic marker that the associated pedestrian has been to, the first geographic marker being provided with an identity information registration device for inputting identity information of a pedestrian, and obtaining the identity information of the associated pedestrian stored by the identity information registration device of the first geographic marker.

In some embodiments, after determining the associated pedestrian associated with the target pedestrian, the method further including:

determining a first tracking identifier corresponding to the associated pedestrian, obtaining trajectory points of the associated pedestrian corresponding to the first tracking identifier in the plurality of frames of image information, and determining a trajectory of the associated pedestrian according to the trajectory points of the associated pedestrian in the plurality of frames of image information; and obtaining map data, and plotting the trajectories of the target pedestrian and the associated pedestrian on the map corresponding to the map data.

In some embodiments, plotting the trajectories of the target pedestrian and the associated pedestrian on the map corresponding to the map data, includes:

plotting the trajectory of the target pedestrian and the trajectory of the associated pedestrian in different colors; and plotting trajectories of pedestrians having different degrees of association with the target pedestrian in different colors.

Embodiments of the present disclosure further provide a target pedestrian tracking apparatus, including:

an obtaining module, configured to obtain video information, and parse the video information to obtain a plurality of frames of image information;

an identification module, configured to identify pedestrians and enclosed geographic markers in the image information;

an assignment module, configured to assign a corresponding tracking identifier to each pedestrian; and a processing module, configured to, for a target tracking identifier, obtain trajectory points of a target pedestrian corresponding to the target tracking identifier in the plurality of frames of image information, and determine a trajectory of the target pedestrian according to the trajectory points of the target pedestrian in the plurality of frames of image information, wherein the trajectory of the target pedestrian includes a geographic marker and a specific location that the target pedestrian has been to.

In some embodiments, the apparatus further includes a determination module, configured to perform at least one of:

determining, according to the trajectory of the target pedestrian, a first target geographic marker that the target pedestrian has been to and a first time period during which the target pedestrian has stayed at the first target geographic marker, and determining, according to image information corresponding to the first target geographic marker, another pedestrian that has stayed at the first target geographic marker in the first time period as a first associated pedestrian, and a degree of association between the first associated pedestrian and the target pedestrian as a first degree of association;

determining, according to image information corresponding to the target pedestrian, another pedestrian having a distance less than a preset distance from the target pedestrian as a first associated pedestrian;

determining, according to image information corresponding to the target pedestrian, another pedestrian that has touched a same article as the target pedestrian as a first associated pedestrian; or determining, according to image information corresponding to a first target geographic marker, another pedestrian that has stayed at the first target geographic marker in a second time period as a second associated pedestrian, and a degree of association between the second associated pedestrian and the target pedestrian as a second degree of association, the second time period being a time period after the first time period.

In some embodiments, the apparatus further includes: a marking module, configured to determine whether the target pedestrian wears a mask in the first target geographic marker according to the image information corresponding to the first target geographic marker; in response to that the target pedestrian does not wear a mask, obtain map data, and mark the first target geographic marker as a geographic marker of a first risk level on a map corresponding to the map data; and in response to that the target pedestrian wears a mask, mark the first target geographic marker as a geographic marker of a second risk level on the map corresponding to the map data.

In some embodiments, the apparatus further includes a marker display module, configured to, upon receiving a click instruction for the first target geographic marker on the map, display on the map a trajectory of the target pedestrian within the first target geographic marker and the first time period.

In some embodiments, the determination module is further configured to perform at least one of:

determining, according to a trajectory of the first associated pedestrian, a second target geographic marker that the first associated pedestrian has been to and a third time period during which the first associated pedestrian has stayed at the second target geographic marker; and determining, according to image information corresponding to the second target geographic marker, another pedestrian that has stayed at the second target geographic marker in the third time period as a third associated pedestrian, and a degree of association between the third associated pedestrian and the target pedestrians as a third degree of association;

determining, according to image information corresponding to the first associated pedestrian, another pedestrian having a distance less than a preset distance from the first associated pedestrian as a third associated pedestrian; or determining, according to image information corresponding to the first associated pedestrian, another pedestrian that has touched a same article as the first associated pedestrian as a third associated pedestrian.

In some embodiments, the apparatus further includes an information pushing module, configured to determine a first tracking identifier corresponding to the associated pedestrian, obtain trajectory points of the associated pedestrian corresponding to the first tracking identifier in the plurality of frames of image information, and determine a trajectory of the associated pedestrian according to the trajectory points of the associated pedestrian in the plurality of frames of image information; and determine identity information of the associated pedestrian according to the trajectory of the associated pedestrian, and send target information to a mobile device of the associated pedestrian corresponding to the identity information, the target information including at least one of: that the associated pedestrian is associated with the target pedestrian, a degree of association between the associated pedestrian and the target pedestrian, the first target geographic marker, and a closest distance from the associated pedestrian to the target pedestrian.

In some embodiments, the information pushing module is specifically configured to determine, according to the trajectory of the associated pedestrian, a first geographic marker that the associated pedestrian has been to, the first geographic marker being provided with an identity information registration device for inputting identity information of a pedestrian, and obtain the identity information of the associated pedestrian stored by the identity information registration device of the first geographic marker.

In some embodiments, the apparatus further includes a trajectory plotting module, configured to determine a first tracking identifier corresponding to the associated pedestrian, acquire trajectory points of the associated pedestrian corresponding to the first tracking identifier in the plurality of frames of image information, and determine a trajectory of the associated pedestrian according to the trajectory points of the associated pedestrian in the plurality of frames of image information; and obtain map data, and plot the trajectories of the target pedestrian and the associated pedestrian on the map corresponding to the map data.

In some embodiments, the trajectory plotting module is specifically configured to plot the trajectory of the target pedestrian and the trajectory of the associated pedestrian in different colors, and plot trajectories of pedestrians having different degrees of association with the target pedestrian in different colors.

Embodiments of the present disclosure also provide a target pedestrian tracking apparatus including a processor and a memory storing thereon a program or instructions executable on the processor, the program or instructions are executed by the processor to implement the steps of the target pedestrian tracking method as described above.

The embodiments of present disclosure have the following beneficial effects.

In the above-mentioned solutions, video information is parsed to obtain multiple frames of image information, pedestrians and enclosed geographic markers in the image information are identified, and each pedestrian is assigned with a corresponding tracking identifier, so as to obtain trajectory points of a target pedestrian corresponding to a target tracking identifier in the plurality of frames of image information. The trajectory points of the target pedestrian in the plurality of frames of image information are connected to each other, so as to obtain a trajectory of the target pedestrian, thereby to quickly finish the tracking and positioning of the target pedestrian.

BRIEF DESCRIPTION OF THE DRAWINGS

FIG. 1 is a flowchart of a target pedestrian tracking method according to an embodiment of the present disclosure;

FIGS. 2 and 3 are schematic diagrams of determining a pedestrian B associated with a target pedestrian A according to an embodiment of the present disclosure;

DETAILED DESCRIPTION

Figure 3:
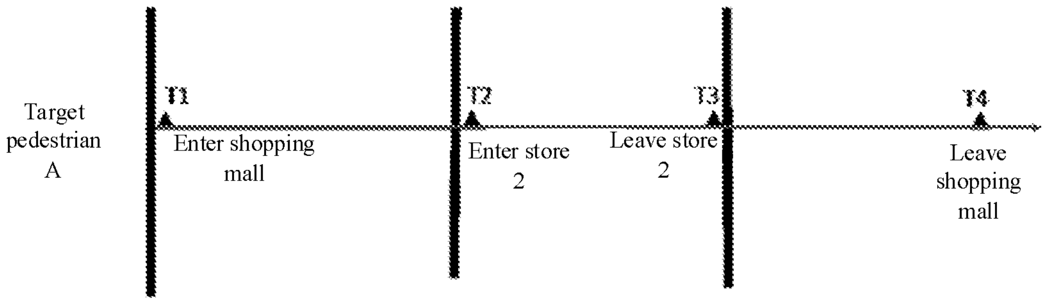

In order to make the technical problems to be solved, technical solutions, and advantages of the embodiments of the present disclosure more apparent, a detailed description will be given below with reference to the accompanying drawings and specific embodiments.

Embodiments of the present disclosure provide a target pedestrian tracking method and apparatus, so as to improve tracking efficiency of the target pedestrian.

Embodiments of the present disclosure provide a target pedestrian tracking method, as shown in FIG. 1, including following steps.

Step 101: obtaining video information, and parsing the video information to obtain a plurality of frames of image information.

In the embodiments of the present disclosure, the video information, including video information of a public area, video information in a merchant store, video information in an underground garage, etc., may be obtained through a camera disposed in a public place such as a shopping mall, a road. When a video stream is decoded and analyzed, it is able to parse the video information, so as to obtain the plurality of frames of image information.

Step 102: identifying pedestrians and enclosed geographic markers in the image information.

The image information includes a pedestrian and a physical entity, and the image information may be parsed by using a pedestrian detection algorithm, so as to identify the pedestrian in the image information. For example, a human head in the image information is detected by using the pedestrian detection algorithm, and the pedestrian may be determined through the human head. Alternatively, a human body in the image information is detected by using a pedestrian detection algorithm, and the pedestrian may be determined through the human body. Alternatively, a human head+a human body in the image information are detected by using a pedestrian detection algorithm, and the pedestrian may be determined through the human head+the human body.

When structural parsing is performed on the image information, it is able to extract such marker information as store names from the image information, so as to identify such geographic markers as stores, elevators in the image information.

Step 103: assigning a corresponding tracking identifier to each pedestrian.

The tracking identifiers correspond to pedestrians respectively, and each tracking identifier uniquely represents one pedestrian. The tracking identifier may be a string of numbers or a combination of numbers and letters.

Step 104: for a target tracking identifier, obtaining trajectory points of a target pedestrian corresponding to the target tracking identifier in the plurality of frames of image information, and determining a trajectory of the target pedestrian according to the trajectory points of the target pedestrian in the plurality of frames of image information, where the trajectory of the target pedestrian includes a geographic marker and a specific location that the target pedestrian has been to.

In the embodiments of the present disclosure, such an object tracking algorithm as a sort algorithm may be used to track pedestrians. Specifically, a pedestrian in image information is circled by using a pedestrian detection box, a Kalman filtering algorithm is used to predict a position of the pedestrian, an estimated value in a next state is predicted (such as predicting a position of the pedestrian detection box in a next frame of image information) by using a value in a previous state (such as a position of the pedestrian detection box in a previous frame of image information) and a measurement value in a current state (such as a position of the pedestrian detection box identified in a current frame of image information), so as to realize the pre-determination of the position of pedestrian. Matching is performed by using a Hungarian algorithm between a pre-determined result and a target detection result at a next time point (such as an actual position of the pedestrian detection box identified in the next frame of image information), and according to the matching result, it is able to realize that the pedestrian detection box predicted by tracking according to the previous frame of image information is associated with the pedestrian detection box detected in the subsequent frame of image information. In this way, the pedestrian detection box detected in the subsequent frame of image information can be used to represent a successfully tracked pedestrian detection box, so as to finish the tracking of the pedestrian, and associate pedestrian detection boxes in different frames. For example, with regard to a pedestrian detection box A, corresponding to a tracking identifier $a_1$, a position of the pedestrian detection box A in a kth frame of image information and a position of the pedestrian detection box A in a (k+1)th frame of image information are used to predict a position of the pedestrian detection box A in a (k+2)th frame of image information, so as to obtain a prediction result. A position of a pedestrian detection box B in the (k+2)th frame of image information is identified, and matching is performed by using a Hungarian algorithm between the prediction result and the position of the pedestrian detection box B. In response to that a matching degree between the prediction result and the position of the pedestrian detection box B is greater than a set matching degree threshold value, the pedestrian detection box B may be associated with the pedestrian detection box A, and the pedestrian detection box B and the pedestrian detection box A are considered as pedestrian detection boxes corresponding to a same pedestrian, where the pedestrian detection box B also corresponds to the tracking identifier $a_1$. In this way, the tracking of the pedestrian in different frames of image information is finished.

With regard to a given target tracking identifier, a target pedestrian (circled by a pedestrian detection box) corresponding to the target tracking identifier in the plurality of frames of image information can be obtained through the above-mentioned steps, so it is able to obtain trajectory points of the target pedestrian in the plurality of frames of image information. A position of the target pedestrian in each frame of image information is fixed, and each trajectory point represents a position of the target pedestrian in each frame of image information, which may be an approximate geographical position or a specific geographical position point. The plurality of frames of image information may be obtained by different cameras, and the trajectory point may be identified by a preset position point of the pedestrian detection box, such as a central point or an upper left corner of the pedestrian detection box. A trajectory of the target pedestrian may be determined according to the trajectory points of the target pedestrian in the plurality of frames of image information, the trajectory of the target pedestrian includes geographic markers which the target pedestrian has been to. As shown in FIG. 2, a trajectory of a target pedestrian A includes a store 1 and a store 2 which the target pedestrian has been to. The trajectory of the target pedestrian may further include a specific location that the target pedestrian has been to. For example, the specific location is pre-set as an elevator, an elevator that the target pedestrian has been to may be determined according to the trajectory of the target pedestrian.

In addition, a moving direction of the target pedestrian may also be determined through the trajectory of the target pedestrian. For example, that the target pedestrian A is located at a trajectory point 1 is determined according to the image information at a first time point, that the target pedestrian A is located at a trajectory point 2 is determined according to the image information at a second time point, that the target pedestrian A is located at a trajectory point 3 is determined according to the image information at a third time point, and that the target pedestrian A is located at a trajectory point 4 is determined according to the image information at a fourth time point, where the fourth time point being located after the third time point, the third time point being located after the second time point, and the second time point being located after the first time point. Next, it can be determined that the moving direction of the target pedestrian A is the trajectory point 1→the trajectory point 2→the trajectory point 3→the trajectory point 4. In one specific example, as shown in FIG. 2, the moving direction of the target pedestrian A is from a pedestrian entrance of a shopping mall→store 1→store 2.

The trajectory point of the target pedestrian in each frame of image information may be converted into a corresponding geographical position in the map data according to a relative position relationship between the geographic marker and the trajectory point of the target pedestrian in the image information and a geographical position of the geographic marker, multiple trajectory points in multiple frames of image information may be converted into corresponding geographical positions in the map data, and the geographical positions are connected to each other, so as to obtain the trajectory of the target pedestrian.

The target pedestrian is an object that needs to be tracked, e.g., a pedestrian with abnormal health information. After determining that the health information about a certain pedestrian is abnormal, it is determined that the pedestrian needs to be tracked and positioned, the pedestrian may be determined as a target pedestrian, and a target tracking identifier corresponding to the target pedestrian is determined. In the embodiment of the present disclosure, the target pedestrian may be one or more pedestrians.

In the embodiments of the present disclosure, video information is parsed to obtain the plurality of frames of image information, pedestrians and geographic markers in the image information are identified, and each pedestrian is assigned with a corresponding tracking identifier, so as to obtain the trajectory points of the target pedestrian corresponding to the target tracking identifier in the plurality of frames of image information. The trajectory of the target pedestrian is obtained according to the trajectory points of the target pedestrian in the plurality of frames of image information, so as to quickly finish the tracking and positioning of the target pedestrian.

After the tracking and positioning of the target pedestrian is completed, a result of the tracking and positioning may be outputted according to needs or an instruction inputted by a user, for example, when the user requests to output the tracking and positioning result of the target pedestrian A, the outputted tracking and positioning result may be: XX time, camera XX, target pedestrian A, geographic marker keywords (e.g., store name, stairs, XX advertisement), pixel location of target pedestrian A in image information, pixel location of geographic marker in image information, frame number of image information, moving direction and motion state of target pedestrian A (moving forward or standing still), relative location of geographic marker to target pedestrian A (above, below, left, in the middle of, right, etc.).

In some embodiments, after the trajectory of the target pedestrian is obtained, an associated pedestrian associated with the target pedestrian may be determined according to the target pedestrian, which includes at least one of:

- determining, according to the trajectory of the target pedestrian, a first target geographic marker that the target pedestrian has been to and a first time period during which the target pedestrian has stayed at the first target geographic marker, and determining, according to image information corresponding to the first target geographic marker, another pedestrian that has stayed at the first target geographic marker in the first time period as a first associated pedestrian, and a degree of association between the first associated pedestrian and the target pedestrian as a first degree of association;
- determining, according to image information corresponding to the target pedestrian, another pedestrian having a distance less than a preset distance from the target pedestrian as a first associated pedestrian;
- determining, according to image information corresponding to the target pedestrian, another pedestrian that has touched a same article as the target pedestrian as a first associated pedestrian; or
- determining, according to image information corresponding to a first target geographic marker, another pedestrian that has stayed at the first target geographic marker in a second time period as a second associated pedestrian, and a degree of association between the second associated pedestrian and the target pedestrian as a second degree of association, the second time period being a time period after the first time period.

For example, when the target pedestrian is a pedestrian with abnormal health information, the associated pedestrian associated with the target pedestrian is determined, a risk pedestrian may be determined, and corresponding measures may be taken, such as notifying the risk pedestrian of relevant information and applying health management and control measures to the risk pedestrian.

In one specific example, a pedestrian having a spatio-temporal intersection with the target pedestrian may be determined as a first associated pedestrian associated with the target pedestrian, and a degree of association between the first associated pedestrian and the target pedestrian is a first degree of association. As shown in FIG. 2, it may be determined according to the trajectory of target pedestrian A that the target pedestrian A has shopped at store 1 and store 2, it may be found through the image information collected by a camera at a location of store 2 that pedestrian B has shopped at store 2, and time of stay of pedestrian B in store 2 intersects with time of stay of target pedestrian A in store 2, so pedestrian B may be determined to be the first associated pedestrian.

The trajectory of the target pedestrian A is shown in FIG. 3, entering the shopping mall at time T1, entering the store 2 in the shopping mall at time T2, leaving the store 2 at time T3, and leaving the shopping mall at time T4.

Rules for determining the associated pedestrian associated with the target pedestrian are as follows.

1. In a case that the pedestrian B leaves the shopping mall before the time T1, it is determined that the pedestrian B is not associated with the target pedestrian A.
2. In a case that the pedestrian B is still in the shopping mall after the time T1 but has not been to the store 2 within the time T2-T3, a closest distance between the pedestrian B and the target pedestrian A and a corresponding time are recorded, and a determination record is given: time: hh:mm:ss, DD/MM, YYYY, the closest distance XX between pedestrian B and target pedestrian A in the shopping mall, identification of image information frame and coordinates of target pedestrian A in the image information. In a case that the smallest distance from pedestrian B to the target pedestrian A is less than a preset distance (e.g., 1 m), pedestrian B may be determined to be the first associated pedestrian of target pedestrian A.
3. In a case that the pedestrian B is still in the shopping mall after the time T1 and has been to the store 2 within the time T2-T3, the pedestrian B may be determined as the first associated pedestrian of the target pedestrian A. A determination record may be given: time: hh:mm:ss, DD/MM, YYYY, a closest distance XX between pedestrian B and target pedestrian A in the store 2 of the shopping mall, identification of image information frame, coordinates of target pedestrian A in the image information.
4. In a case that the pedestrian B has been to the store 2 after the time T3, the pedestrian B may be determined as a second associated pedestrian of the target pedestrian A, and a determination record may be given: time: hh:mm:ss, DD/MM, YYYY, a closest distance XX between pedestrian B and target pedestrian A in the store 2 of the shopping mall, identification of image information frame, coordinates of target pedestrian A in the image information.
5. In a case that pedestrian B has touched a same object as target pedestrian A, pedestrian B may be determined as the first associated pedestrian of target pedestrian A.

In addition, a mask detection algorithm may be used to detect whether a pedestrian wears a mask, and determine the degree of association between the target pedestrian A and the pedestrian B based on a detection result. For example, on the basis of the determination result obtained according to the above Rules 1-5, in a case that the target pedestrian A and/or the pedestrian B wears a mask, the degree of association between the target pedestrian A and the pedestrian B may be reduced. In a specific example, pedestrian B is determined as the first associated pedestrian of target pedestrian A according to Rules 1-5 described above, and pedestrian B may be re-determined to be a second associated pedestrian of target pedestrian A when it is detected that target pedestrian A and/or pedestrian B wears a mask. The pedestrian B is determined to be the second associated pedestrian of target pedestrian A according to Rules 1-5 described above, and pedestrian B may be re-determined to be the third associated pedestrian of target pedestrian A when it is detected that target pedestrian A and/or pedestrian B wears a mask.

In some embodiments, after determining the first associated pedestrian associated with the target pedestrian, a third associated pedestrian associated with the target pedestrian may also be determined according to the first associated pedestrian, including at least one of:

determining, according to a trajectory of the first associated pedestrian, a second target geographic marker that the first associated pedestrian has been to and a third time period during which the first associated pedestrian has stayed at the second target geographic marker; and determining, according to image information corresponding to the second target geographic marker, another pedestrian that has stayed at the second target geographic marker in the third time period as a third associated pedestrian, and a degree of association between the third associated pedestrian and the target pedestrian as a third degree of association;

determining, according to image information corresponding to the first associated pedestrian, another pedestrian having a distance less than a preset distance from the first associated pedestrian as a third associated pedestrian; or determining, according to image information corresponding to the first associated pedestrian, another pedestrian that has touched a same article as the first associated pedestrian as a third associated pedestrian.

After determining the associated pedestrian associated with the target pedestrian, target information may be pushed to the associated pedestrian, so that the associated pedestrian learns that he/she is associated with the target pedestrian, and takes corresponding measures, such as reporting information thereof and an association relationship with the target pedestrian to a health management and control person.

In some embodiments, after determining the associated pedestrian associated with the target pedestrian, the method further including:

determining a first tracking identifier corresponding to the associated pedestrian, obtaining trajectory points of the associated pedestrian corresponding to the first tracking identifier in the plurality of frames of image information, and determining a trajectory of the associated pedestrian according to the trajectory points of the associated pedestrian in the plurality of frames of image information; and determining identity information of the associated pedestrian according to the trajectory of the associated pedestrian, and sending target information to a mobile device of the associated pedestrian corresponding to the identity information, the target information including at least one of: that the associated pedestrian is associated with the target pedestrian, a degree of association between the associated pedestrian and the target pedestrian, the first target geographic marker, and a closest distance from the associated pedestrian to the target pedestrian.

The identity information of the associated pedestrian may be obtained in various ways, for example, obtaining data of an operator, where the data of the operator includes a trajectory corresponding to each pedestrian (a trajectory of a pedestrian may be determined through a trajectory of a mobile device of the pedestrian). Matching is performed between the trajectory of the associated pedestrian and the trajectory of the pedestrian, in a case that the trajectory of the associated pedestrian C matches a trajectory of a pedestrian D, it may be determined that the associated pedestrian C is the pedestrian D Identity information of the pedestrian D and number of a corresponding mobile device may be obtained from the operator, so it is able to send the target information to the mobile device corresponding to the pedestrian D.

In some embodiments, it is further able to determine a first geographic marker that the associated pedestrian has been to according to the trajectory of the associated pedestrian, the first geographic marker is provided with an identity information registration device for a pedestrian to input his/her identity information, and obtaining the identity information of the associated pedestrian stored by the identity information registration device of the first geographic marker.

For example, it is determined that pedestrian B arrives at an entrance of a shopping mall at a time point b according to a trajectory of the pedestrian B, an identity information registration device is provided at the entrance of the shopping mall, identity information recorded by the identity information registration device at the entrance of the shopping mall at the time point b may be obtained, and the identity information recorded by the identity information registration device at the entrance of the shopping mall at the time point b is taken as identity information of the pedestrian B. Alternatively, it is determined that the pedestrian B arrives at the store 3 at the time point c according to the trajectory of the pedestrian B, an identity information registration device is provided at an entrance of the store 3, identity information recorded by the identity information registration device at the entrance of the store 3 at the time point c may be obtained, and the identity information recorded by the identity information registration device at the entrance of the store 3 at the time point c is taken as the identity information of the pedestrian B.

The identity information may include a name of the pedestrian B, health information, a corresponding mobile device number, a photograph of the pedestrian B, etc. In a case that the identity information registration device at the entrance of the shopping mall records multiple pieces of identity information at the time point b, the identity information corresponding to the pedestrian B among the multiple pieces of identity information may be determined according to the image information and the photograph of the pedestrian B.

After determining the identity information of the associated pedestrian B, the following information may be pushed to the associated pedestrian B: time (hh:mm:ss, DD/MM, YYYY), location (in the store 2 of the shopping mall), closest distance XX between pedestrian B (having mobile phone number XX) and target pedestrian A, the degree of association between the associated pedestrian B and target pedestrian A, health management and control regulations corresponding to the degree of association and etc.

In some embodiments, after determining the first target geographic marker that the target pedestrian has been to according to the trajectory of the target pedestrian, the first target geographic marker may be marked as a risk area on a map, so that a user may visually obtain information of the risk area. Furthermore, a risk level of the geographic marker may be determined according to whether the pedestrian wears a mask.

In some embodiments, the method further includes:

determining whether the target pedestrian wears a mask in the first target geographic marker according to the image information corresponding to the first target geographic marker; and in response to that the target pedestrian does not wear a mask, obtaining map data, and marking the first target geographic marker as a geographic marker of a first risk level on a map corresponding to the map data; and in response to that the target pedestrian wears a mask, marking the first target geographic marker as a geographic marker of a second risk level on the map corresponding to the map data.

In some embodiments, after marking the first target geographic marker as a geographic marker of a first risk level or a second risk level on the map, the method further includes: upon receiving a click instruction for the first target geographic marker on the map, displaying on the map a trajectory of the target pedestrian within the first target geographic marker and the first time period.

In this way, the user may visually obtain information about the activity of the target pedestrian within the first target geographic marker. For example, when the user clicks on the store 2 on the map, the trajectory of the target pedestrian A within an area covered by the store 2 and the time of stay (T2-T3) of the target pedestrian A in the store 2 may be displayed.

In the embodiments of the present disclosure, the trajectory of the associated pedestrian associated with the target pedestrian may be obtained and the trajectory of the target pedestrian and the trajectory of the associated pedestrian are plotted on the map, so that the user may clearly and visually obtain whereabouts of the target pedestrian and the associated pedestrian.

In some embodiments, after determining the associated pedestrian associated with the target pedestrian, the method further including:

determining a first tracking identifier corresponding to the associated pedestrian, obtaining trajectory points of the associated pedestrian corresponding to the first tracking identifier in the plurality of frames of image information, and determining a trajectory of the associated pedestrian according to the trajectory points of the associated pedestrian in the plurality of frames of image information; and obtaining map data, and plotting the trajectories of the target pedestrian and the associated pedestrian on the map corresponding to the map data.

In the embodiments of the present disclosure, such an object tracking algorithm as a sort algorithm may be used to track pedestrians. Specifically, a pedestrian in image information is circled by using a pedestrian detection box, a Kalman filtering algorithm is used to predict a position of the pedestrians, an estimated value in a next state is predicted (such as predicting a position of the pedestrian detection box in a next frame of image information) by using a value in a previous state (such as a position of the pedestrian detection box in a previous frame of image information) and a measurement value in a current state (such as a position of the pedestrian detection box identified in a current frame of image information), so as to realize the pre-determination of the position of pedestrian. Matching is performed by using a Hungarian algorithm between a pre-determined result and a target detection result at a next time point (such as an actual position of the pedestrian detection box identified in the next frame of image information), and according to the matching result, it is able to realize that the pedestrian detection box predicted by tracking according to the previous frame of image information is associated with the pedestrian detection box detected in the subsequent frame of image information. In this way, the pedestrian detection box detected in the subsequent frame of image information can be used to represent a successfully tracked pedestrian detection box, so as to finish the tracking of the pedestrian, and associate pedestrian detection boxes in different frames. For example, with regard to a pedestrian detection box A, corresponding to a tracking identifier $a_1$, a position of the pedestrian detection box A in a kth frame of image information and a position of the pedestrian detection box A in a (k+1)th frame of image information are used to predict a position of the pedestrian detection box A in a (k+2)th frame of image information, so as to obtain a prediction result. A position of a pedestrian detection box B in the (k+2)th frame of image information is identified, and matching is performed by using a Hungarian algorithm between the prediction result and the position of the pedestrian detection box B. In response to that a matching degree between the prediction result and the position of the pedestrian detection box B is greater than a set matching degree threshold value, the pedestrian detection box B may be associated with the pedestrian detection box A, and the pedestrian detection box B and the pedestrian detection box A are considered as pedestrian detection boxes corresponding to a same pedestrian, where the pedestrian detection box B also corresponds to the tracking identifier $a_1$. In this way, the tracking of the pedestrian in different frames of image information is finished.

With regard to a given first tracking identifier, an associated pedestrian (circled by a pedestrian detection box) corresponding to the first tracking identifier in the plurality of frames of image information can be obtained through the above-mentioned steps, so it is able to obtain trajectory points of the associated pedestrian in the plurality of frames of image information. A position of the associated pedestrian in each frame of image information is fixed, and each trajectory point represents a position of the associated pedestrian in each frame of image information, which may be an approximate geographical position or a specific geographical position point. The plurality of frames of image information may be obtained by different cameras, and the trajectory point may be identified by a preset position point of the pedestrian detection box, such as a central point or an upper left corner of the pedestrian detection box. A trajectory of the associated pedestrian may be determined according to the trajectory points of the associated pedestrian in the plurality of frames of image information, the trajectory of the associated pedestrian includes geographic markers that the associated pedestrian has been to. As shown in FIG. 2, a trajectory of the associated pedestrian B includes a store 2 which the associated pedestrian has been to. The trajectory of the associated pedestrian may further include a specific location that the associated pedestrian has been to. For example, the specific location is preset as an elevator, an elevator that the associated pedestrian has been to may be determined according to the trajectory of the associated pedestrian.

In some embodiments, a moving direction of a pedestrian may also be obtained according to the moving of a pedestrian detection box in the image information. For example, that an associated pedestrian B is located at a trajectory point 1 is determined according to image information at a first time point, that the associated pedestrian B is located at a trajectory point 2 is determined according to image information at a second time point, that the associated pedestrian B is located at a trajectory point 3 is determined according to image information at a third time point, and that the associated pedestrian B is located at a trajectory point 4 is determined according to image information at a fourth time point, where the fourth time point being located after the third time point, the third time point being located after the second time point, and the second time point being located after the first time point. Next, it can be determined that the moving direction of the associated pedestrian B is the trajectory point 1→the trajectory point 2→the trajectory point 3→the trajectory point 4. In a specific example, as shown in FIG. 2, the moving direction of the associated pedestrian B is from a garage to the store 2.

The trajectory point of the associated pedestrian in each frame of image information may be converted into a corresponding geographical position in the map data according to a relative position relationship between the geographic marker and the trajectory point of the associated pedestrian in the image information and a geographical position of the geographic marker, multiple trajectory points in multiple frames of image information may be converted into corresponding geographical positions in the map data, and the geographical positions are connected to each other, so as to obtain the trajectory of the associated pedestrian.

In a specific example, according to a structured result of the image information, a key marker in the image information and a spatial relative distance between a pedestrian and the key marker are obtained. For example, a store name S1, a pedestrian A and the pedestrian A being XX pixels to the front-left of the store S1 are identified from image information obtained by a camera C1 at a time point T1. A physical distance between the pedestrian A and the camera C1 may be obtained according to such parameters as a size of the pedestrian detection box, a focal distance, a mounting height and a resolution of the camera C1. A physical distance from the camera C1 to the store S1 may also be obtained. The moving direction of the pedestrian may be obtained according to the moving of the pedestrian detection box in continuous frames. Optionally, a direction that a face is toward (generally, the moving direction is usually the direction that the face is toward) at the time point T1 may be obtained through pedestrian face detection. In this way, a relatively accurate physical position and moving direction of the pedestrian A with respect to the camera C1 and the store S1 may be obtained, so as to obtain the trajectory of the pedestrian A.

Figure 4:
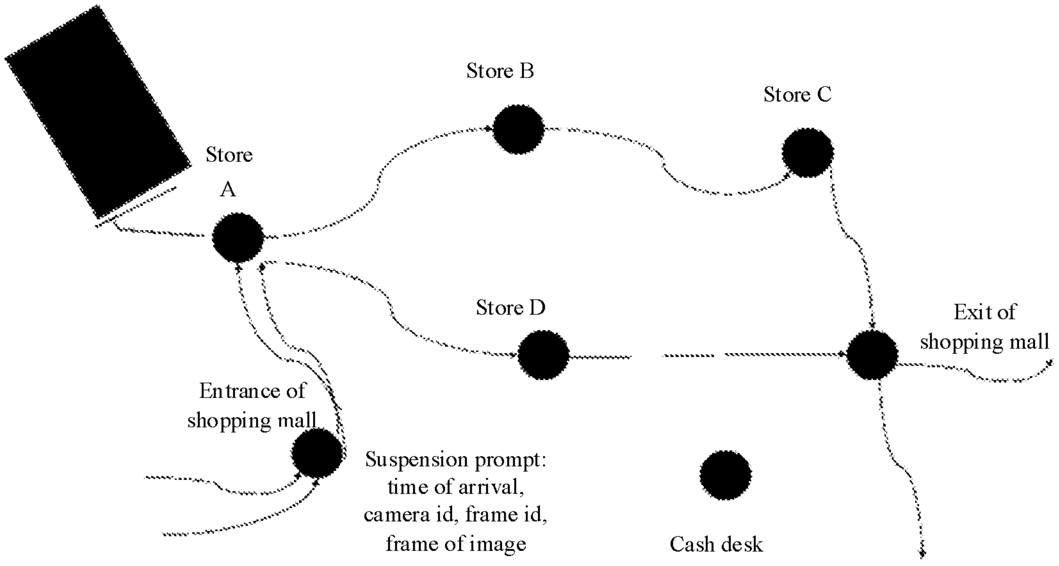
FIG. 4 is a schematic diagram of plotting a pedestrian trajectory on a map according to an embodiment of the present disclosure.

A trajectory of a pedestrian as shown in FIG. 4 may be plotted on a map, and it is visually derived that a pedestrian went from a store A to a store B, to a store C, and to an exit of a shopping mall. Another pedestrian went to the store A from an entrance of the shopping mall, to a store D, and to the exit of the shopping mall. The trajectory of the pedestrian track at least includes the geographic markers that the pedestrian has been to and the moving direction of pedestrian.

In order to distinguish trajectories of different pedestrians, the trajectory of the target pedestrian and the trajectory of the associated pedestrian may be plotted in different colors, and trajectories of pedestrians having different degrees of association with the target pedestrian are plotted in different colors. For example, the trajectory of the target pedestrian A is marked in red, and the geographic markers that the target pedestrian A has been to are marked in red. The trajectory of the associated pedestrian B is marked in orange, the trajectory of the associated pedestrian C is marked in yellow, etc.

After the trajectories of the target pedestrian and the associated pedestrian are determined, geographic markers that the target pedestrian and the associated pedestrian have been to may be determined, so that each geographic marker that the target pedestrian and the associated pedestrian have been to may be determined. Furthermore, information about the target pedestrian and the associated pedestrian that have been to each geographic marker, which includes a pedestrian arrival time, a camera identification, a frame identification of image information and the image information, may be displayed on the map. In addition, the target pedestrian and the associated pedestrian may be further marked on the image information. For example, both the target pedestrian A and the associated pedestrian B have been to the store B, when a mouse hovers over the store B, a prompt information pop-up window may appear, including time during which the target pedestrian A stayed in the store B, time during which the associated pedestrian B stayed in the store B, a camera identification, a frame identification of image information, and the image information (the target pedestrian A and the associated pedestrian B are marked on the image information).

In a case that the user clicks on store B, the user may be further presented with trajectories of target pedestrian A and associated pedestrian B within store B.

In the embodiments of the present disclosure, when the information about the target pedestrian and the associated pedestrian that have been to the geographic marker is presented to the user, the information may be presented to the user in the form of a list. Multiple geographic markers and lists corresponding to the geographic markers are stored in the map data, and each list of the geographic marker includes a list of pedestrians who have been to the geographic marker in each time period, such as pedestrians who have been to the store 1 in the time period from Tx1 to Tx2 and information about the pedestrians.

In addition, pedestrians arriving at one geographic marker from another geographic marker, such as pedestrians from store 1 to store 2 during the time period Tx1-Tx2, may also be determined according to the trajectories of the pedestrians and presented to the user in the form of a list.

The technical solution of the embodiments of the present disclosure may be applied to a target pedestrian tracking apparatus, and the target pedestrian tracking apparatus may be used by the user to track and locate a target pedestrian, obtain an associated pedestrian associated with the target pedestrian, obtain a risk level of a geographic marker, etc.

Figure 5:
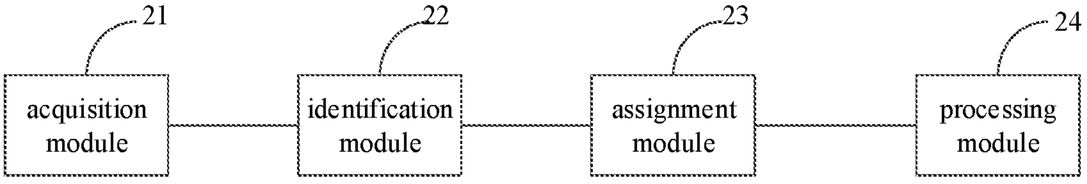
FIG. 5 is a block diagram of a target pedestrian tracking apparatus according to an embodiment of the present disclosure.

Embodiments of the present disclosure further provide a target pedestrian tracking apparatus, as shown in FIG. 5, including an acquisition module 21, an identification module 22, an assignment module 23 and a processing module 24.

The acquisition module 21 is configured to obtain video information, and parse the video information to obtain a plurality of frames of image information.

In the embodiments of the present disclosure, the video information, including video information of a public area, video information in a merchant store, video information in an underground garage, etc., may be obtained through a camera disposed in a public place such as a shopping mall, a road. When a video stream is decoded and analyzed, it is able to parse the video information, so as to obtain the plurality of frames of image information.

The identification module 22 is configured to identify pedestrians and enclosed geographic markers in the image information.

The image information includes a pedestrian and a physical entity, and the image information may be parsed by using a pedestrian detection algorithm, so as to identify the pedestrian in the image information. For example, a human head in the image information is detected by using the pedestrian detection algorithm, and the pedestrian may be determined through the human head. Alternatively, a human body in the image information is detected by using a pedestrian detection algorithm, and the pedestrian may be determined through the human body. Alternatively, a human head+a human body in the image information are detected by using a pedestrian detection algorithm, and the pedestrian may be determined through the human head+the human body.

When structured parsing is performed on the image information, it is able to extract such significant physical entities as store names, stairs, from the image information, and identify such enclosed geographic markers as stores, elevators in the physical entities.

The assignment module 23 is configured to assign a corresponding tracking identifier to each pedestrian.

The tracking identifiers correspond to pedestrians respectively, and each tracking identifier uniquely represents one pedestrian. The tracking identifier may be a string of numbers or a combination of numbers and letters.

The processing module 24 is configured to, for a target tracking identifier, obtain trajectory points of a target pedestrian corresponding to the target tracking identifier in the plurality of frames of image information, and determine a trajectory of the target pedestrian according to the trajectory points of the target pedestrian in the plurality of frames of image information, where the trajectory of the target pedestrian includes a geographic marker and a specific location that the target pedestrian has been to.

In the embodiments of the present disclosure, such an object tracking algorithm as a sort algorithm may be used to track pedestrians. Specifically, a pedestrian in image information is circled by using a pedestrian detection box, a Kalman filtering algorithm is used to predict a position of the pedestrian, an estimated value in a next state is predicted (such as predicting a position of the pedestrian detection box in a next frame of image information) by using a value in a previous state (such as a position of the pedestrian detection box in a previous frame of image information) and a measurement value in a current state (such as a position of the pedestrian detection box identified in a current frame of image information), so as to realize the pre-determination of the position of pedestrian. Matching is performed by using a Hungarian algorithm between a pre-determined result and a target detection result at a next time point (such as an actual position of the pedestrian detection box identified in the next frame of image information), and according to the matching result, it is able to realize that the pedestrian detection box predicted by tracking according to the previous frame of image information is associated with the pedestrian detection box detected in the subsequent frame of image information. In this way, the pedestrian detection box detected in the subsequent frame of image information can be used to represent a successfully tracked pedestrian detection box, so as to finish the tracking of the pedestrian, and associate pedestrian detection boxes in different frames. For example, with regard to a pedestrian detection box A, corresponding to a tracking identifier $a_1$, a position of the pedestrian detection box A in a kth frame of image information and a position of the pedestrian detection box A in a (k+1)th frame of image information are used to predict a position of the pedestrian detection box A in a (k+2)th frame of image information, so as to obtain a prediction result. A position of a pedestrian detection box B in the (k+2)th frame of image information is identified, and matching is performed by using a Hungarian algorithm between the prediction result and the position of the pedestrian detection box B. In response to that a matching degree between the prediction result and the position of the pedestrian detection box B is greater than a set matching degree threshold value, the pedestrian detection box B may be associated with the pedestrian detection box A, and the pedestrian detection box B and the pedestrian detection box A are considered as pedestrian detection boxes corresponding to a same pedestrian, where the pedestrian detection box B also corresponds to the tracking identifier a1. In this way, the tracking of the pedestrian in different frames of image information is finished.

With regard to a given target tracking identifier, a target pedestrian (circled by a pedestrian detection box) corresponding to the target tracking identifier in the plurality of frames of image information can be obtained through the above-mentioned steps, so it is able to obtain trajectory points of the target pedestrian in the plurality of frames of image information. A position of the target pedestrian in each frame of image information is fixed, and each trajectory point represents a position of the target pedestrian in each frame of image information, which may be an approximate geographical position or a specific geographical position point. The plurality of frames of image information may be obtained by different cameras, and the trajectory point may be identified by a preset position point of the pedestrian detection box, such as a central point or an upper left corner of the pedestrian detection box. A trajectory of the target pedestrian may be determined according to the trajectory points of the target pedestrian in the plurality of frames of image information, the trajectory of the target pedestrian includes geographic markers which the target pedestrian has been to. As shown in FIG. 2, a trajectory of the target pedestrian A includes a store 1 and a store 2 that the target pedestrian has been to. The trajectory of the target pedestrian may further include a specific location that the target pedestrian has been to. For example, the specific location is pre-set as an elevator, an elevator that the target pedestrian has been to may be determined according to the trajectory of the target pedestrian.

In addition, a moving direction of the target pedestrian may also be determined through the trajectory of the target pedestrian. For example, that the target pedestrian A is located at a trajectory point 1 is determined according to the image information at a first time point, that the target pedestrian A is located at a trajectory point 2 is determined according to the image information at a second time point, that the target pedestrian A is located at a trajectory point 3 is determined according to the image information at a third time point, that the target pedestrian A is located at a trajectory point 4 is determined according to the image information at a fourth time point, where the fourth time point being located after the third time point, the third time point being located after the second time point, and the second time point being located after the first time point. Next, it can be determined that the moving direction of the target pedestrian A is the trajectory point 1→the trajectory point 2→the trajectory point 3→the trajectory point 4. In one specific example, as shown in FIG. 2, the moving direction of the target pedestrian A is from a pedestrian entrance of a shopping mall→store 1→store 2.

The trajectory point of the target pedestrian in each frame of image information may be converted into a corresponding geographical position in the map data according to a relative position relationship between the geographic marker and the trajectory point of the target pedestrian in the image information, and a geographical position of the geographic marker, multiple trajectory points in multiple frames of image information may be converted into corresponding geographical positions in the map data, and the geographical positions are connected to each other, so as to obtain the trajectory of the target pedestrian.

The target pedestrian is an object that needs to be tracked, e.g., a pedestrian with abnormal health information. After determining that the health information about a certain pedestrian is abnormal, it is determined that the pedestrian needs to be tracked and positioned, the pedestrian may be determined as a target pedestrian, and a target tracking identifier corresponding to the target pedestrian is determined. In the embodiment of the present disclosure, the target pedestrian may be one or more pedestrians.

In the embodiments of the present disclosure, video information is parsed to obtain the plurality of frames of image information, pedestrians and enclosed geographic markers in the image information are identified, and each pedestrian is assigned with a corresponding tracking identifier, so as to obtain the trajectory points of the target pedestrian corresponding to the target tracking identifier in the plurality of frames of image information. The trajectory points of the target pedestrian in the plurality of frames of image information are connected to obtain the trajectory of the target pedestrian, so as to quickly finish the tracking and positioning of the target pedestrian.

After the tracking and positioning of the target pedestrian is completed, a result of the tracking and positioning may be outputted according to needs or an instruction inputted by a user, for example, when the user requests to output the tracking and positioning result of the target pedestrian A, the outputted tracking and positioning result may be: XX time, camera XX, target pedestrian A, geographic marker keywords (e.g., store name, stairs, XX advertisement), pixel location of target pedestrian A in image information, pixel location of geographic marker in image information, frame number of image information, moving direction and motion state of target pedestrian A (moving forward or standing still), relative location of geographic marker to target pedestrian A (above, below, left, in the middle of, right, etc.).

In some embodiments, after obtaining the trajectory of the target pedestrian, an associated pedestrian associated with the target pedestrian may be determined according to the target pedestrian, the apparatus further including: a determination module, configured to perform at least one of:

- determining, according to the trajectory of the target pedestrian, a first target geographic marker that the target pedestrian has been to and a first time period during which the target pedestrian has stayed at the first target geographic marker, and determining, according to image information corresponding to the first target geographic marker, another pedestrian that has stayed at the first target geographic marker in the first time period as a first associated pedestrian, and a degree of association between the first associated pedestrian and the target pedestrian as a first degree of association;
- determining, according to image information corresponding to the target pedestrian, another pedestrian having a distance less than a preset distance from the target pedestrian as a first associated pedestrian;
- determining, according to image information corresponding to the target pedestrian, another pedestrian that has touched a same article as the target pedestrian as a first associated pedestrian; or
- determining, according to image information corresponding to a first target geographic marker, another pedestrian that has stayed at the first target geographic marker in a second time period as a second associated pedestrian, and a degree of association between the second associated pedestrian and the target pedestrian as a second degree of association, the second time period being a time period after the first time period.

For example, when the target pedestrian is a pedestrian with abnormal health information, the associated pedestrian associated with the target pedestrian is determined, a risk pedestrian may be determined, and corresponding measures may be taken, such as notifying the risk pedestrian of relevant information and applying health management and control measures to the risk pedestrian.

In one specific example, a pedestrian having a spatio-temporal intersection with the target pedestrian may be determined as a first associated pedestrian associated with the target pedestrian, and a degree of association between the first associated pedestrian and the target pedestrian is a first degree of association. As shown in FIG. 2, it may be determined according to the trajectory of target pedestrian A that the target pedestrian A has shopped at store 1 and store 2, it may be found through the image information collected by a camera at a location of store 2 that pedestrian B has shopped at store 2, and time of stay of pedestrian B at store 2 intersects with time of stay of target pedestrian A at store 2, so pedestrian B may be determined to be the first associated pedestrian.

The trajectory of the target pedestrian A is shown in FIG. 3, entering the shopping mall at time T1, entering the store 2 in the shopping mall at time T2, leaving the store 2 at time T3, and leaving the shopping mall at time T4.

Rules for determining the associated pedestrian associated with the target pedestrian are as follows.

1. In a case that the pedestrian B leaves the shopping mall before the time T1, it is determined that the pedestrian B is not associated with the target pedestrian A.
2. In a case that the pedestrian B is still in the shopping mall after the time T1 but has not been to the store 2 within the time T2-T3, a closest distance between the pedestrian B and the target pedestrian A and a corresponding time are recorded, and a determination record is given: time: hh: mm: ss, DD/MM, YYYY, the closest distance XX between pedestrian B and target pedestrian A in the shopping mall, identification of image information frame and coordinates of target pedestrian A in the image information. In a case that the smallest distance from pedestrian B to target pedestrian A is less than a preset distance (e.g., 1 m), pedestrian B may be determined to be the first associated pedestrian of target pedestrian A.
3. In a case that the pedestrian B is still in the shopping mall after the time T1 and has been to the store 2 within the time T2-T3, the pedestrian B may be determined as the first associated pedestrian of the target pedestrian A. A determination record may be given: time: hh: mm: ss, DD/MM, YYYY, a closest distance XX between pedestrian B and target pedestrian A in the store 2 of the shopping mall, identification of image information frame; coordinates of target pedestrian A in the image information.
4. In a case that the pedestrian B has been to the store 2 after the time T3, the pedestrian B may be determined as a second associated pedestrian of the target pedestrian A, and a determination record may be given: time: hh:mm:ss, DD/MM, YYYY, a closest distance XX between pedestrian B and target pedestrian A in the store 2 of the shopping mall, identification of image information frame, coordinates of target pedestrian A in the image information.

5. In a case that pedestrian B has touched a same object as target pedestrian A, pedestrian B may be determined as the first associated pedestrian of target pedestrian A.

In addition, a mask detection algorithm may be used to detect whether a pedestrian wears a mask, and determine the degree of association between the target pedestrian A and the pedestrian B based on a detection result. For example, on the basis of the determination results obtained according to the above Rules 1-5, in a case that the target pedestrian A and/or the pedestrian B wears a mask, the degree of association between the target pedestrian A and the pedestrian B may be reduced. In a specific example, pedestrian B is determined as the first associated pedestrian of target pedestrian A according to Rules 1-5 described above, and pedestrian B may be re-determined to be a second associated pedestrian of target pedestrian A when it is detected that target pedestrian A and/or pedestrian B wears a mask. The pedestrian B is determined to be the second associated pedestrian of target pedestrian A according to Rules 1-5 described above, and pedestrian B may be re-determined to be the third associated pedestrian of target pedestrian A when it is detected that target pedestrian A and/or pedestrian B wears a mask.

In some embodiments, after determining the first associated pedestrian associated with the target pedestrian, a third associated pedestrian associated with the target pedestrian may also be determined according to the first associated pedestrian, the determination module is further configured to perform at least one of:

- determining, according to a trajectory of the first associated pedestrian, a second target geographic marker that the first associated pedestrian has been to and a third time period during which the first associated pedestrian has stayed at the second target geographic marker; and determining, according to image information corresponding to the second target geographic marker, another pedestrian that has stayed at the second target geographic marker in the third time period as a third associated pedestrian, and a degree of association between the third associated pedestrian and the target pedestrian as a third degree of association;
- determining, according to image information corresponding to the first associated pedestrian, another pedestrian having a distance less than a preset distance from the first associated pedestrian as a third associated pedestrian; or
- determining, according to image information corresponding to the first associated pedestrian, another pedestrian that has touched a same article as the first associated pedestrian as a third associated pedestrian.

After determining the associated pedestrian associated with the target pedestrian, target information may be pushed to the associated pedestrian, so that the associated pedestrian learns that he/she is associated with the target pedestrian, and takes corresponding measures, such as reporting information thereof and an association relationship with the target pedestrian to a health management and control person.

In some embodiments, the apparatus further includes: an information pushing module, configured to determine a first tracking identifier corresponding to the associated pedestrian, obtain trajectory points of the associated pedestrian corresponding to the first tracking identifier in the plurality of frames of image information, and determine a trajectory of the associated pedestrian according to the trajectory points of the associated pedestrian in the plurality of frames of image information; and determine identity information of the associated pedestrian according to the trajectory of the associated pedestrian, and send target information to a mobile device of the associated pedestrian corresponding to the identity information, the target information including at least one of: that the associated pedestrian is associated with the target pedestrian, a degree of association between the associated pedestrian and the target pedestrian, the first target geographic marker, and a closest distance from the associated pedestrian to the target pedestrian.

The identity information of an associated pedestrian may be obtained in various ways, for example, obtaining data of an operator, where the data of the operator includes a trajectory corresponding to each pedestrian (a trajectory of a pedestrian may be determined through a trajectory of a mobile device of the pedestrian). Matching is performed between the trajectory of the associated pedestrian and the trajectory of the pedestrian, in a case that the trajectory of the associated pedestrian C matches a trajectory of a pedestrian D, it may be determined that the associated pedestrian C is the pedestrian D. Identity information of the pedestrian D and number of a corresponding mobile device may be obtained from the operator, so it is able to send the target information to the mobile device corresponding to the pedestrian D.

In some embodiments, the information pushing module is specifically configured to determine, according to the trajectory of the associated pedestrian, a first geographic marker that the associated pedestrian has been to, the first geographic marker being provided with an identity information registration device for inputting identity information of a pedestrian, and obtain identity information of the associated pedestrian stored by the identity information registration device of the first geographic marker.

For example, it is determined that pedestrian B arrives at an entrance of a shopping mall at a time point b according to a trajectory of the pedestrian B, an identity information registration device is provided at the entrance of the shopping mall, identity information recorded by the identity information registration device at the entrance of the shopping mall at the time point b may be obtained, and the identity information recorded by the identity information registration device at the entrance of the shopping mall at the time point b is taken as identity information of the pedestrian B. Alternatively, it is determined that the pedestrian B arrives at the store 3 at the time point c according to the trajectory of the pedestrian B, an identity information registration device is provided at an entrance of the store 3, identity information recorded by the identity information registration device at the entrance of the store 3 at the time point c may be obtained, and the identity information recorded by the identity information registration device at the entrance of the store 3 at the time point c is taken as the identity information of the pedestrian B.

The identity information may include a name of the pedestrian B, health information, a corresponding mobile device number, a photograph of the pedestrian B, etc. In a case that the identity information registration device at the entrance of the shopping mall records multiple pieces of identity information at the time point b, the identity information corresponding to the pedestrian B among the multiple pieces of identity information may be determined according to the image information and the photograph of the pedestrian B.

After determining the identity information of the associated pedestrian B, the following information may be pushed to the associated pedestrian B: time (hh:mm:ss, DD/MM, YYYY), location (in the store 2 of the shopping mall), closest distance XX between pedestrian B (having mobile phone number XX) and target pedestrian A, the degree of association between the associated pedestrian B and target pedestrian A, health management and control regulations corresponding to the degree of association and etc.

In some embodiments, after determining the first target geographic marker that the target pedestrian has been to according to the trajectory of the target pedestrian, the first target geographic marker may be marked as a risk area on a map, so that a user may visually obtain information of the risk area. Furthermore, a risk level of the geographic marker may be determined according to whether the pedestrian wears a mask.

In some embodiments, the apparatus further includes: a marking module, configured to determine whether the target pedestrian wears a mask in the first target geographic marker according to the image information corresponding to the first target geographic marker; and in response to that the target pedestrian does not wear a mask, obtain map data, and mark the first target geographic marker as a geographic marker of a first risk level on a map corresponding to the map data; and in response to that the target pedestrian wears a mask, mark the first target geographic marker as a geographic marker of a second risk level on the map corresponding to the map data.

In some embodiments, the apparatus further includes: a marker display module, configured to, upon receiving a click instruction for the first target geographic marker on the map, display on the map a trajectory of the target pedestrian within the first target geographic marker and the first time period.

In this way, the user may visually obtain information about the activity of the target pedestrian within the first target geographic marker. For example, when the user clicks on the store 2 on the map, the trajectory of the target pedestrian A within an area covered by the store 2 and the time of stay (T2-T3) of the target pedestrian A in the store 2 may be displayed.

In some embodiments, the apparatus further includes:

a track plotting module, configured to determine a first tracking identifier corresponding to the associated pedestrian, obtain trajectory points of the associated pedestrian corresponding to the first tracking identifier in the plurality of frames of image information, and determine a trajectory of the associated pedestrian according to the trajectory points of the associated pedestrian in the plurality of frames of image information; and obtain map data, and plot the trajectories of the target pedestrian and the associated pedestrian on the map corresponding to the map data.

In the embodiments of the present disclosure, the trajectory of the associated pedestrian associated with the target pedestrian may be obtained and the trajectory of the target pedestrian and the trajectory of the associated pedestrian are plotted on the map, so that the user may clearly and visually obtain whereabouts of the target pedestrian and the associated pedestrian.

In the embodiments of the present disclosure, such an object tracking algorithm as a sort algorithm may be used to track pedestrians. Specifically, a pedestrian in image information is circled by using a pedestrian detection box, a Kalman filtering algorithm is used to predict a position of the pedestrian, an estimated value in a next state is predicted (such as predicting a position of the pedestrian detection box in a next frame of image information) by using a value in a previous state (such as a position of the pedestrian detection box in a previous frame of image information) and a measurement value in a current state (such as a position of the pedestrian detection box identified in a current frame of image information), so as to realize the pre-determination of the position of pedestrians. Matching is performed by using a Hungarian algorithm between a pre-determined result and a target detection result at a next time point (such as an actual position of the pedestrian detection box identified in the next frame of image information), and according to the matching result, it is able to realize that the pedestrian detection box predicted by tracking according to the previous frame of image information is associated with the pedestrian detection box detected in the subsequent frame of image information. In this way, the pedestrian detection box detected in the subsequent frame of image information can be used to represent a successfully tracked pedestrian detection box, so as to finish the tracking of the pedestrian, and associate pedestrian detection boxes in different frames. For example, with regard to a pedestrian detection box A, corresponding to a tracking identifier $a_1$, a position of the pedestrian detection box A in a kth frame of image information and a position of the pedestrian detection box A in the (k+1)th frame of image information are used to predict a position of the pedestrian detection box A in a (k+2)th frame of image information, so as to obtain a prediction result. A position of a pedestrian detection box B in the (k+2)th frame of image information is identified, and matching is performed by using a Hungarian algorithm between the prediction result and the position of the pedestrian detection box B. In response to that a matching degree between the prediction result and the position of the pedestrian detection box B is greater than a set matching degree threshold value, the pedestrian detection box B may be associated with the pedestrian detection box A, and the pedestrian detection box B and the pedestrian detection box A are considered as pedestrian detection boxes corresponding to a same pedestrian, where the pedestrian detection box B also corresponds to the tracking identifier $a_1$. In this way, the tracking of the pedestrian in different frames of image information is finished.

With regard to a given first tracking identifier, an associated pedestrian (circled by a pedestrian detection box) corresponding to the first tracking identifier in the plurality of frames of image information can be obtained through the above-mentioned steps, so it is able to obtain trajectory points of the associated pedestrian in the plurality of frames of image information. A position of the associated pedestrian in each frame of image information is fixed, and each trajectory point represents a position of the associated pedestrian in each frame of image information, which may be an approximate geographical position or a specific geographical position point. The plurality of frames of image information may be obtained by different cameras, and the trajectory point may be identified by a preset position point of the pedestrian detection box, such as a central point or an upper left corner of the pedestrian detection box. A trajectory of the associated pedestrian may be determined according to the trajectory points of the associated pedestrian in the plurality of frames of image information, the trajectory of the associated pedestrian includes geographic markers that the associated pedestrian has been to. As shown in FIG. 2, a trajectory of the associated pedestrian B includes a store 2 which the associated pedestrian has been to. The trajectory of the associated pedestrian may further include a specific location which the associated pedestrian has been to. For example, the specific location is preset as an elevator, an elevator that the associated pedestrian has been to may be determined from the trajectory of the associated pedestrian.

In some embodiments, a moving direction of a pedestrian may also be obtained according to the moving of a pedestrian detection box in the image information, For example, that an associated pedestrian B is located at a trajectory point 1 is determined according to image information at a first time point, that the associated pedestrian B is located at a trajectory point 2 is determined according to image information at a second time point, that the associated pedestrian B is located at a trajectory point 3 is determined according to image information at a third time point, and that the associated pedestrian B is located at a trajectory point 4 is determined according to image information at a fourth time point, where the fourth time point being located after the third time point, the third time point being located after the second time point, and the second time point being located after the first time point. Next, it can be determined that the moving direction of the associated pedestrian B is the trajectory point 1→the trajectory point 2→the trajectory point 3→the trajectory point 4. In a specific example, as shown in FIG. 2, the moving direction of the associated pedestrian B is from a garage to the store 2.

The trajectory point of the associated pedestrian in each frame of image information may be converted into a corresponding geographical position in the map data according to a relative position relationship between the geographic marker and the trajectory point of the associated pedestrian in the image information and a geographical position of the geographic marker, multiple trajectory points in multiple frames of image information may be converted into corresponding geographical positions in the map data, and the geographical positions are connected to each other, so as to obtain the trajectory of the associated pedestrian.

In a specific example, according to a structured result of the image information, a key marker in the image information and a spatial relative distance between a pedestrian and the key marker are obtained. For example, a store name S1, a pedestrian A and the pedestrian A being XX pixels to the front-left of the store S1 are identified from image information obtained by a camera C1 at a time point T1. A physical distance between the pedestrian A and the camera C1 may be obtained according to such parameters as a size of the pedestrian detection box, a focal distance, a mounting height and a resolution of the camera C1. A physical distance from the camera C1 to the store S1 may also be obtained. The moving direction of the pedestrian may be obtained according to the moving of the pedestrian detection box in continuous frame. Optionally, a direction that a face is toward (generally, the moving direction is usually the direction that the face is toward) at the time point T1 may be obtained through pedestrian face detection (generally, the movement direction is the face orientation direction). In this way, a relatively accurate physical position and moving direction of the pedestrian A with respect to the camera C1 and the store S1 may be obtained, so as to obtain the trajectory of the pedestrian A.

A trajectory of a pedestrian as shown in FIG. 4 may be plotted on a map, and it is visually derived that a pedestrian went from a store A to a store B, to a store C, and to an exit of the shopping mall. Another pedestrian went to the store A from an entrance of the shopping mall, to a store D, and to the exit of the shopping mall. The trajectory of the pedestrian at least includes the geographic markers that the pedestrian has been to and the moving direction of pedestrian.

In some embodiments, the track plotting module is specifically configured to plot the trajectory of the target pedestrian and the trajectory of the associated pedestrian in different colors, and plot trajectories of pedestrians having different degrees of association with the target pedestrian in different colors.

In order to distinguish trajectories of different pedestrians, the trajectory of the target pedestrian and the trajectory of the associated pedestrian may be plotted in different colors, and trajectories of pedestrians having different degrees of association with the target pedestrian are plotted in different colors. For example, the trajectory of the target pedestrian A is marked in red, and the geographic markers that the target pedestrian A has been to are marked in red. The trajectory of the associated pedestrian B is marked in orange, the trajectory of the associated pedestrian C is marked in yellow, etc.

After the trajectories of the target pedestrian and the associated pedestrian are determined, geographic markers that the target pedestrian has been to and the associated pedestrian may be determined, so that each geographic marker that the target pedestrian and the associated pedestrian have been to may be determined. Furthermore, information about the target pedestrian and the associated pedestrian that have been to each geographic marker, which includes a pedestrian arrival time, a camera identification, a frame identification of image information and the image information, may be displayed on the map. In addition, the target pedestrian and the associated pedestrian may be further marked on the image information. For example, both the target pedestrian A and the associated pedestrian B have been to the store B, when a mouse hovers over the store B, a prompt information pop-up window may appear, including time during which the target pedestrian A stayed in the store B, time during which the associated pedestrian B stayed in the store B, a camera identification, a frame identification of image information, and the image information (the target pedestrian A and the associated pedestrian B are marked on the image information).

In a case that the user clicks on store B, the user may be further presented with the trajectories of target pedestrian A and associated pedestrian B within store B.

In the embodiments of the present disclosure, when the information about the target pedestrian and the associated pedestrian that have been to the geographic marker is presented to the user, the information may be presented to the user in the form of a list. Multiple geographic markers and lists corresponding to the geographic markers are stored in the map data, and each list of the geographic marker includes a list of pedestrians who have been to the geographic marker in each time period, such as pedestrians who have been to the store 1 in the time period from Tx1 to Tx2 and information about the pedestrians.

In addition, that pedestrians have been to one geographic marker from another geographic marker, such as pedestrians from store 1 to store 2 during the time period Tx1-Tx2, may also be determined according to the trajectories of the pedestrians and presented to the user in the form of a list.

The embodiments of the present disclosure further provide a target pedestrian tracking apparatus including a processor and a memory storing thereon a program or instructions executable on the processor, the program or instructions are executed by the processor to implement the steps of the target pedestrian tracking method as described above.

Embodiments of the present disclosure further provide a readable storage medium having stored thereon a program or instructions, the program or instruction are executed by a processor to implement the steps of the target pedestrian tracking method as described above.

The processor is a processor in the terminal described in the above-mentioned embodiment. The readable storage medium includes a computer readable storage medium such as a computer read only memory (ROM), a random access memory (RAM), a magnetic or optical disk, etc.

The embodiments of the present application further provide a chip, the chip includes a processor and a communication interface, the communication interface is coupled to the processor, and the processor is configured to run a program or instructions to implement various processes of the above-mentioned embodiment of the target pedestrian tracking method, and the same technical effects can be achieved. In order to avoid repetition, the description thereof will not be repeated herein.

It should be appreciated that the chip in the embodiments of the present application may also be referred to as a system-on-a-chip, or the like.

Embodiments of the present application further provide a computer program/program product, the computer program/program product is stored in a storage medium and executed by at least one processor to implement the various processes of the above-mentioned target pedestrian tracking method embodiments and the same technical effects can be achieved. In order to avoid repetition, the description thereof will not be repeated herein.

It should be noted that, a term "include", "have" or any other variation thereof are intended to encompass non-exclusive inclusion, such that a process, method, product or device including a series of elements includes not only those elements, but also other elements not explicitly listed, or elements inherent to the process, method, product or device. Without more restrictions, an element defined by an expression "including a . . . " does not exclude the existence of other identical elements in the process, method, product or device including the element. Furthermore, it should be noted that the scope of the methods and apparatus in the embodiments of the present application is not limited to the order of performing the functions shown or discussed, and may include performing the functions in a substantially simultaneous manner or in a reverse order depending on the functionality involved, e.g., the methods described may be performed in a different order from that described and various steps may be added, omitted, or combined. In addition, features described with reference to certain examples may be combined in other examples.

From the description of the embodiments given above, a person skilled in the art may clearly understand that the method in the embodiments described above can be implemented by means of software plus essential universal hardware platform, but of course also by means of hardware, the former being in many cases a better embodiment. Based on such an understanding, the technical solution of the present application, in essence or in part contributing to the prior art, may be embodied in the form of a computer software product stored in a storage medium (such as a ROM/RAM, a disk, a compact disc). The software includes instructions for causing a terminal (which can be a mobile phone, a computer, a server, an air conditioner, or a network device, etc.) to execute the method according to various embodiments of the present application.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A target pedestrian tracking method, comprising:

obtaining a plurality of frames of image information;

identifying pedestrians and geographic markers in the image information;

assigning a corresponding tracking identifier to each pedestrian; and for a target tracking identifier, obtaining trajectory points of a target pedestrian corresponding to the target tracking identifier in the plurality of frames of image information, and determining a trajectory of the target pedestrian according to the trajectory points of the target pedestrian in the plurality of frames of image information, wherein the trajectory of the target pedestrian comprises a geographic marker and/or a specific location that the target pedestrian has been to; wherein after the trajectory of the target pedestrian is obtained, the method further comprises determining an associated pedestrian associated with the target pedestrian, comprising at least one of:

determining, according to the trajectory of the target pedestrian, a first target geographic marker that the target pedestrian has been to and a first time period during which the target pedestrian has stayed at the first target geographic marker, and determining, according to image information corresponding to the first target geographic marker, another pedestrian that has stayed at the first target geographic marker in the first time period as a first associated pedestrian, and a degree of association between the first associated pedestrian and the target pedestrian as a first degree of association;

determining, according to image information corresponding to the target pedestrian, another pedestrian having a distance less than a preset distance from the target pedestrian as a first associated pedestrian;

determining, according to image information corresponding to the target pedestrian, another pedestrian that has touched a same article as the target pedestrian as a first associated pedestrian; or determining, according to image information corresponding to a first target geographic marker, another pedestrian that has stayed at the first target geographic marker in a second time period as a second associated pedestrian, and a degree of association between the second associated pedestrian and the target pedestrian as a second degree of association, the second time period being a time period after the first time period;

wherein after determining, according to the trajectory of the target pedestrian, the first target geographic marker that the target pedestrian has been to, the method further comprises:

determining whether the target pedestrian wears a mask in the first target geographic marker according to the image information corresponding to the first target geographic marker; and in response to that the target pedestrian does not wear a mask, obtaining map data, and marking the first target geographic marker as a geographic marker of a first risk level on a map corresponding to the map data; and in response to that the target pedestrian wears a mask, marking the first target geographic marker as a geographic marker of a second risk level on the map corresponding to the map data;

wherein after marking the first target geographic marker as a geographic marker of a first risk level or a second risk level on the map, the method further comprises:

upon receiving a click instruction for the first target geographic marker on the map, displaying on the map a trajectory of the target pedestrian within the first target geographic marker and the first time period.

2. The target pedestrian tracking method according to claim 1, wherein determining the associated pedestrian associated with the target pedestrian, further comprises at least one of:

determining, according to a trajectory of the first associated pedestrian, a second target geographic marker that the first associated pedestrian has been to and a third time period during which the first associated pedestrian has stayed at the second target geographic marker; and determining, according to image information corresponding to the second target geographic marker, another pedestrian that has stayed at the second target geographic marker in the third time period as a third associated pedestrian, and a degree of association between the third associated pedestrian and the target pedestrian as a third degree of association;

determining, according to image information corresponding to the first associated pedestrian, another pedestrian having a distance less than a preset distance from the first associated pedestrian as a third associated pedestrian; or determining, according to image information corresponding to the first associated pedestrian, another pedestrian that has touched a same article as the first associated pedestrian as a third associated pedestrian.

3. The target pedestrian tracking method according to claim 1, wherein after determining the associated pedestrian associated with the target pedestrian, the method further comprising:

determining a first tracking identifier corresponding to the associated pedestrian, obtaining trajectory points of the associated pedestrian corresponding to the first tracking identifier in the plurality of frames of image information, and determining a trajectory of the associated pedestrian according to the trajectory points of the associated pedestrian in the plurality of frames of image information; and determining identity information of the associated pedestrian according to the trajectory of the associated pedestrian, and sending target information to a mobile device of the associated pedestrian corresponding to the identity information, the target information comprising at least one of: that the associated pedestrian is associated with the target pedestrian, a degree of association between the associated pedestrian and the target pedestrian, the first target geographic marker, and a closest distance from the associated pedestrian to the target pedestrian.

4. The target pedestrian tracking method according to claim 3, wherein determining identity information of the associated pedestrian according to the trajectory of the associated pedestrian, comprises:

determining, according to the trajectory of the associated pedestrian, a first geographic marker that the associated pedestrian has been to, the first geographic marker being provided with an identity information registration device for inputting identity information of a pedestrian, and obtaining the identity information of the associated pedestrian stored by the identity information registration device of the first geographic marker.

5. The target pedestrian tracking method according to claim 1, wherein after determining the associated pedestrian associated with the target pedestrian, the method further comprising:

determining a first tracking identifier corresponding to the associated pedestrian, obtaining trajectory points of the associated pedestrian corresponding to the first tracking identifier in the plurality of frames of image information, and determining a trajectory of the associated pedestrian according to the trajectory points of the associated pedestrian in the plurality of frames of image information; and obtaining map data, and plotting the trajectories of the target pedestrian and the associated pedestrian on the map corresponding to the map data.

6. The target pedestrian tracking method according to claim 5, wherein plotting the trajectories of the target pedestrian and the associated pedestrian on the map corresponding to the map data, comprises:

plotting the trajectory of the target pedestrian and the trajectory of the associated pedestrian in different colors; and plotting trajectories of pedestrians having different degrees of association with the target pedestrian in different colors.

7. A target pedestrian tracking apparatus comprising a processor and a memory storing thereon a program or instructions executable on the processor, wherein the program or instructions are executed by the processor to implement:

obtaining a plurality of frames of image information;

identifying pedestrians and geographic markers in the image information;

assigning a corresponding tracking identifier to each pedestrian; and for a target tracking identifier, obtaining trajectory points of a target pedestrian corresponding to the target tracking identifier in the plurality of frames of image information, and determining a trajectory of the target pedestrian according to the trajectory points of the target pedestrian in the plurality of frames of image information, wherein the trajectory of the target pedestrian comprises a geographic marker and/or a specific location that the target pedestrian has been to;

after the trajectory of the target pedestrian is obtained, determining an associated pedestrian associated with the target pedestrian, comprising at least one of:

determining, according to the trajectory of the target pedestrian, a first target geographic marker that the target pedestrian has been to and a first time period during which the target pedestrian has stayed at the first target geographic marker, and determining, according to image information corresponding to the first target geographic marker, another pedestrian that has stayed at the first target geographic marker in the first time period as a first associated pedestrian, and a degree of association between the first associated pedestrian and the target pedestrian as a first degree of association;

determining, according to image information corresponding to the target pedestrian, another pedestrian having a distance less than a preset distance from the target pedestrian as a first associated pedestrian;

determining, according to image information corresponding to the target pedestrian, another pedestrian that has touched a same article as the target pedestrian as a first associated pedestrian; or determining, according to image information corresponding to a first target geographic marker, another pedestrian that has stayed at the first target geographic marker in a second time period as a second associated pedestrian, and a degree of association between the second associated pedestrian and the target pedestrian as a second degree of association, the second time period being a time period after the first time period;

after determining, according to the trajectory of the target pedestrian, the first target geographic marker that the target pedestrian has been to, determining whether the target pedestrian wears a mask in the first target geographic marker according to the image information corresponding to the first target geographic marker; and in response to that the target pedestrian does not wear a mask, obtaining map data, and marking the first target geographic marker as a geographic marker of a first risk level on a map corresponding to the map data; and in response to that the target pedestrian wears a mask, marking the first target geographic marker as a geographic marker of a second risk level on the map corresponding to the map data;

after marking the first target geographic marker as a geographic marker of a first risk level or a second risk level on the map, upon receiving a click instruction for the first target geographic marker on the map, displaying on the map a trajectory of the target pedestrian within the first target geographic marker and the first time period.

8. The target pedestrian tracking apparatus according to claim 7, wherein determining the associated pedestrian associated with the target pedestrian, further comprises at least one of:

determining, according to a trajectory of the first associated pedestrian, a second target geographic marker that the first associated pedestrian has been to and a third time period during which the first associated pedestrian has stayed at the second target geographic marker; and determining, according to image information corresponding to the second target geographic marker, another pedestrian that has stayed at the second target geographic marker in the third time period as a third associated pedestrian, and a degree of association between the third associated pedestrian and the target pedestrian as a third degree of association;

determining, according to image information corresponding to the first associated pedestrian, another pedestrian having a distance less than a preset distance from the first associated pedestrian as a third associated pedestrian; or determining, according to image information corresponding to the first associated pedestrian, another pedestrian that has touched a same article as the first associated pedestrian as a third associated pedestrian.

9. The target pedestrian tracking apparatus according to claim 7, wherein the program or instructions are executed by the processor to further implement:

after determining the associated pedestrian associated with the target pedestrian, determining a first tracking identifier corresponding to the associated pedestrian, obtaining trajectory points of the associated pedestrian corresponding to the first tracking identifier in the plurality of frames of image information, and determining a trajectory of the associated pedestrian according to the trajectory points of the associated pedestrian in the plurality of frames of image information; and determining identity information of the associated pedestrian according to the trajectory of the associated pedestrian, and sending target information to a mobile device of the associated pedestrian corresponding to the identity information, the target information comprising at least one of: that the associated pedestrian is associated with the target pedestrian, a degree of association between the associated pedestrian and the target pedestrian, the first target geographic marker, and a closest distance from the associated pedestrian to the target pedestrian.

10. The target pedestrian tracking apparatus according to claim 9, wherein determining identity information of the associated pedestrian according to the trajectory of the associated pedestrian, comprises:

determining, according to the trajectory of the associated pedestrian, a first geographic marker that the associated pedestrian has been to, the first geographic marker being provided with an identity information registration device for inputting identity information of a pedestrian, and obtaining the identity information of the associated pedestrian stored by the identity information registration device of the first geographic marker.

11. The target pedestrian tracking apparatus according to claim 7, wherein the program or instructions are executed by the processor to further implement:

after determining the associated pedestrian associated with the target pedestrian, determining a first tracking identifier corresponding to the associated pedestrian, obtaining trajectory points of the associated pedestrian corresponding to the first tracking identifier in the plurality of frames of image information, and determining a trajectory of the associated pedestrian according to the trajectory points of the associated pedestrian in the plurality of frames of image information; and obtaining map data, and plotting the trajectories of the target pedestrian and the associated pedestrian on the map corresponding to the map data.

12. The target pedestrian tracking apparatus according to claim 11, wherein plotting the trajectories of the target pedestrian and the associated pedestrian on the map corresponding to the map data, comprises:

plotting the trajectory of the target pedestrian and the trajectory of the associated pedestrian in different colors; and plotting trajectories of pedestrians having different degrees of association with the target pedestrian in different colors.

13. A non-transitory readable storage medium having stored thereon a program or instructions, wherein the program or instructions are executed by a processor to implement:

obtaining a plurality of frames of image information;

identifying pedestrians and geographic markers in the image information;

assigning a corresponding tracking identifier to each pedestrian; and for a target tracking identifier, obtaining trajectory points of a target pedestrian corresponding to the target tracking identifier in the plurality of frames of image information, and determining a trajectory of the target pedestrian according to the trajectory points of the target pedestrian in the plurality of frames of image information, wherein the trajectory of the target pedestrian comprises a geographic marker and/or a specific location that the target pedestrian has been to;

after the trajectory of the target pedestrian is obtained, determining an associated pedestrian associated with the target pedestrian, comprising at least one of:

determining, according to the trajectory of the target pedestrian, a first target geographic marker that the target pedestrian has been to and a first time period during which the target pedestrian has stayed at the first target geographic marker, and determining, according to image information corresponding to the first target geographic marker, another pedestrian that has stayed at the first target geographic marker in the first time period as a first associated pedestrian, and a degree of association between the first associated pedestrian and the target pedestrian as a first degree of association;

determining, according to image information corresponding to the target pedestrian, another pedestrian having a distance less than a preset distance from the target pedestrian as a first associated pedestrian;

determining, according to image information corresponding to the target pedestrian, another pedestrian that has touched a same article as the target pedestrian as a first associated pedestrian; or determining, according to image information corresponding to a first target geographic marker, another pedestrian that has stayed at the first target geographic marker in a second time period as a second associated pedestrian, and a degree of association between the second associated pedestrian and the target pedestrian as a second degree of association, the second time period being a time period after the first time period;

after determining, according to the trajectory of the target pedestrian, the first target geographic marker that the target pedestrian has been to, determining whether the target pedestrian wears a mask in the first target geographic marker according to the image information corresponding to the first target geographic marker; and in response to that the target pedestrian does not wear a mask, obtaining map data, and marking the first target geographic marker as a geographic marker of a first risk level on a map corresponding to the map data; and in response to that the target pedestrian wears a mask, marking the first target geographic marker as a geographic marker of a second risk level on the map corresponding to the map data;

after marking the first target geographic marker as a geographic marker of a first risk level or a second risk level on the map, upon receiving a click instruction for the first target geographic marker on the map, displaying on the map a trajectory of the target pedestrian within the first target geographic marker and the first time period.

* * * * *